Oct. 25, 1966 R. L. ESKEN ETAL 3,280,607
MACHINE TOOL
Filed Aug. 1, 1963 9 Sheets-Sheet 1
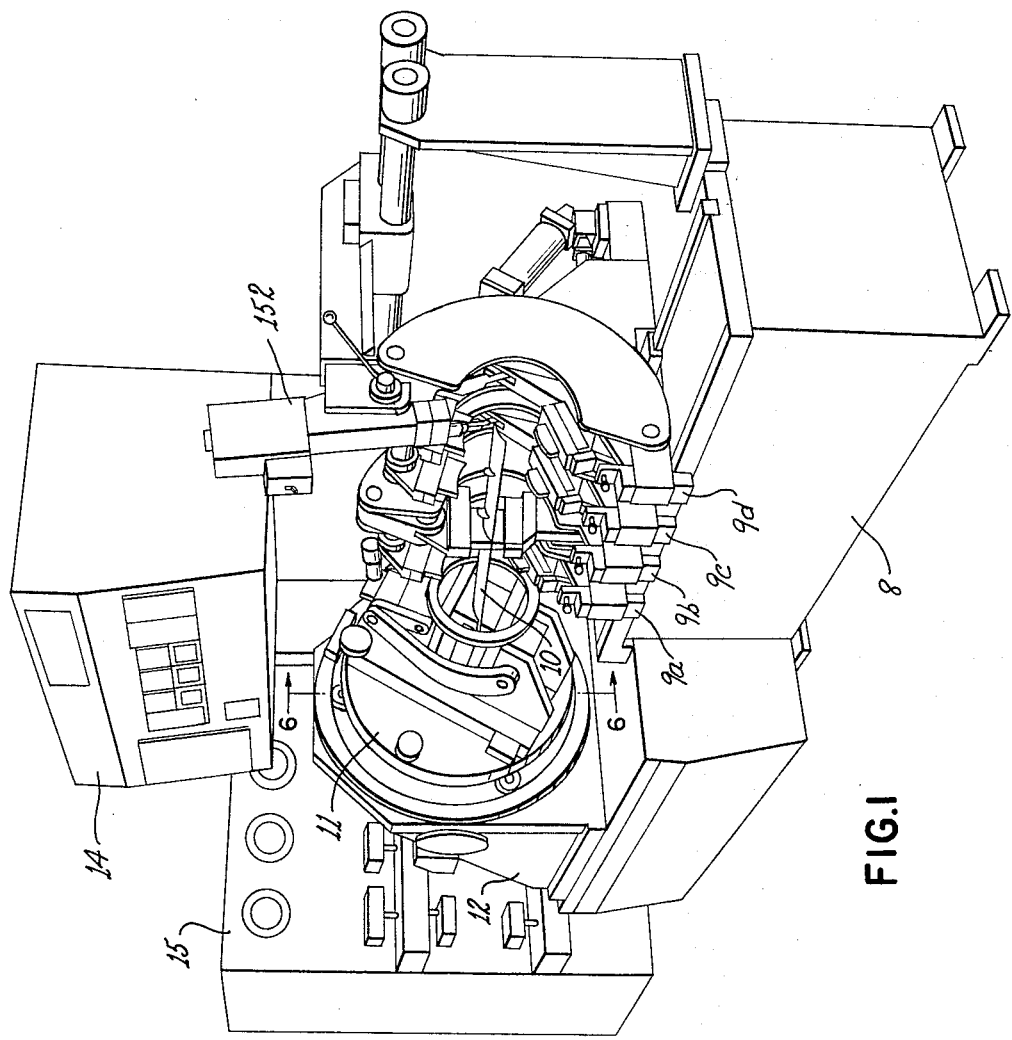
FIG.1
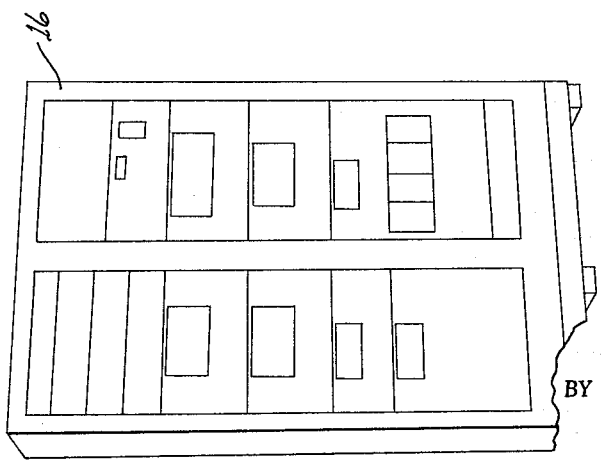
INVENTORS
ROBERT L. ESKEN
JOHN H. KNIGHT
ROBERT W. WHITMORE
BY
ATTORNEY Oct. 25, 1966      R. L. ESKEN ETAL      3,280,607
MACHINE TOOL
Filed Aug. 1, 1963      9 Sheets-Sheet 2
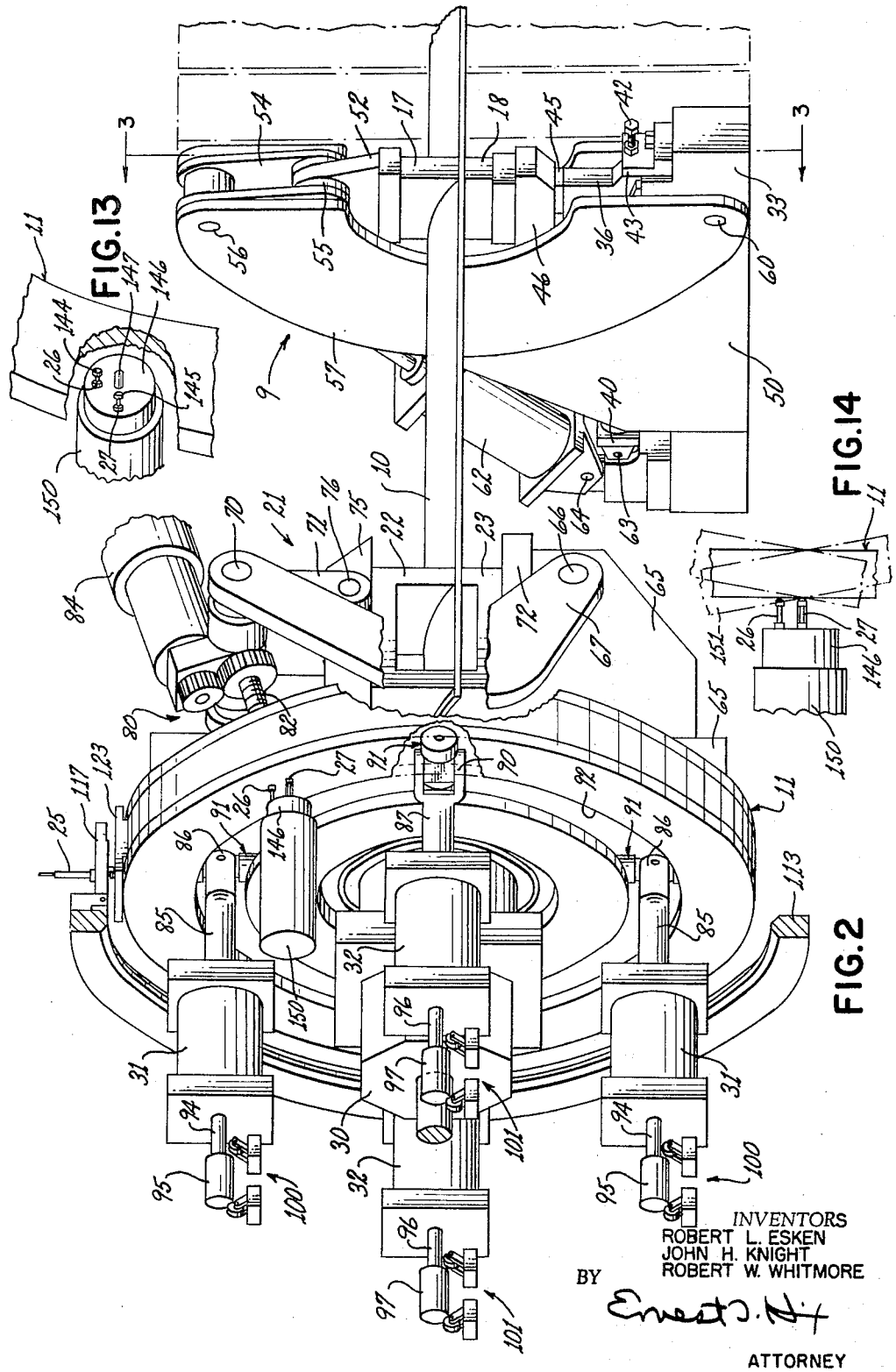
INVENTORS
ROBERT L. ESKEN
JOHN H. KNIGHT
ROBERT W. WHITMORE
BY 
ATTORNEY

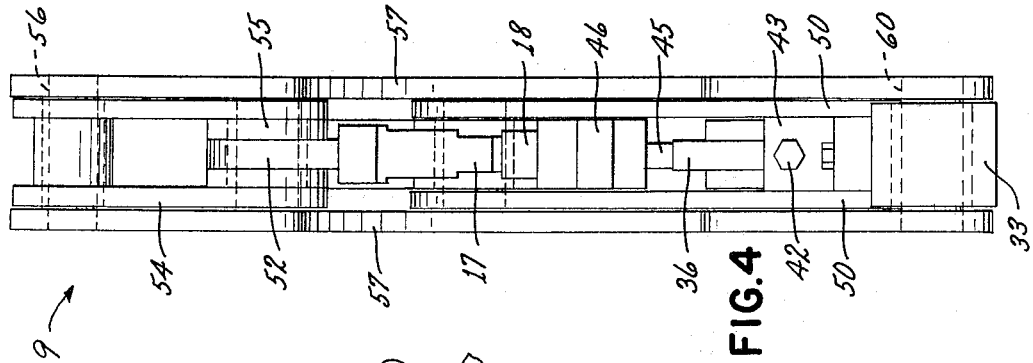
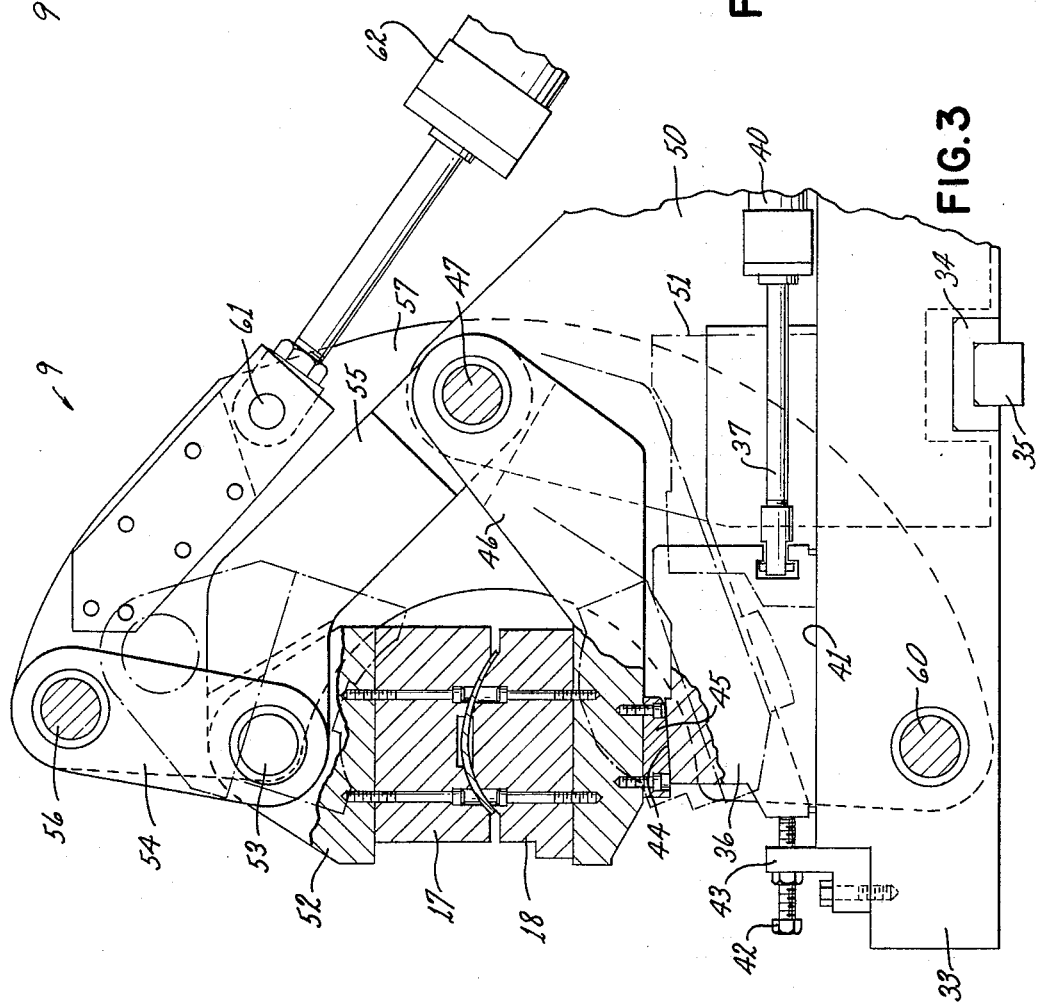

INVENTORS
ROBERT L. ESKEN
JOHN H. KNIGHT
ROBERT W. WHITMORE

BY Ernest J. Hix

ATTORNEY

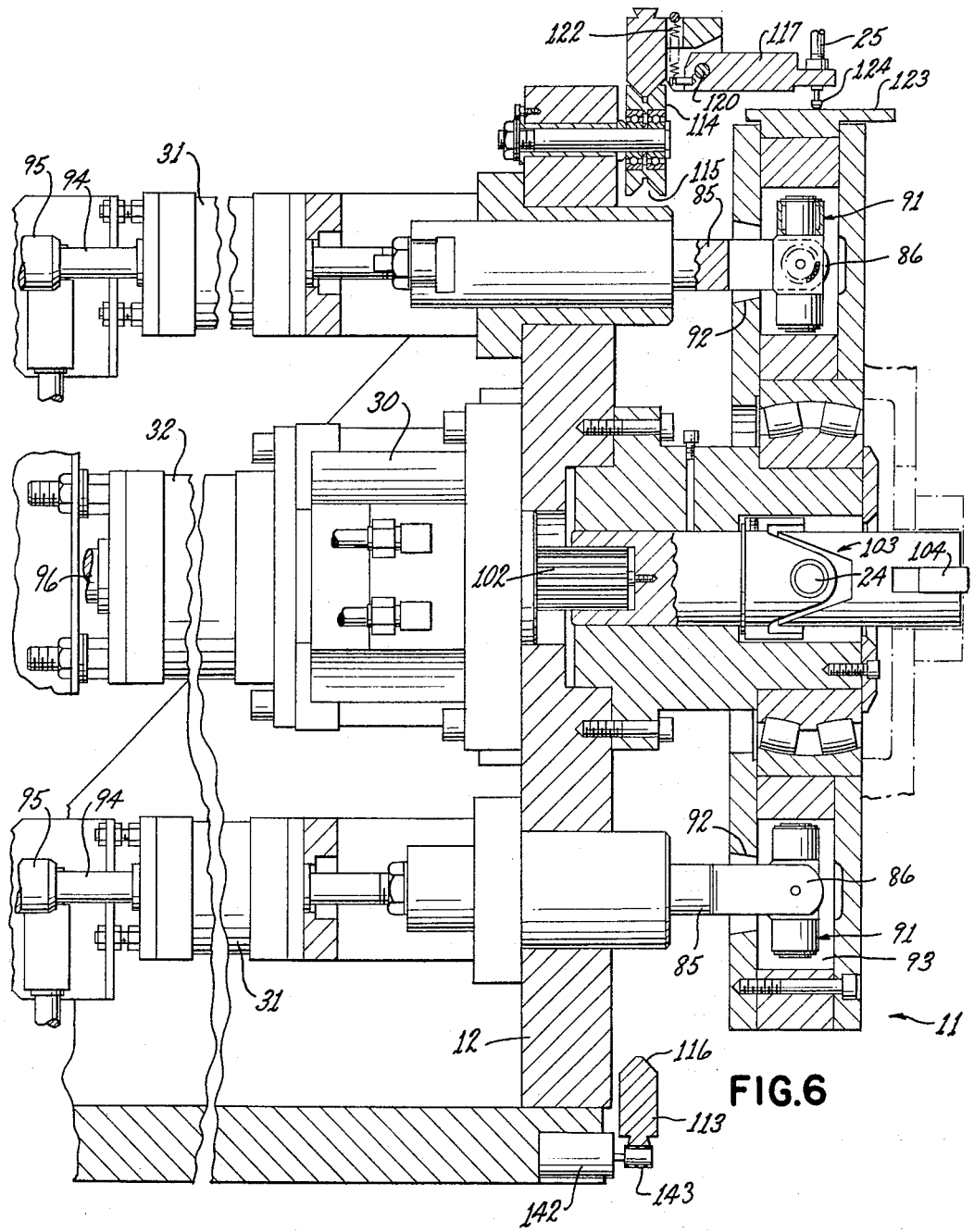
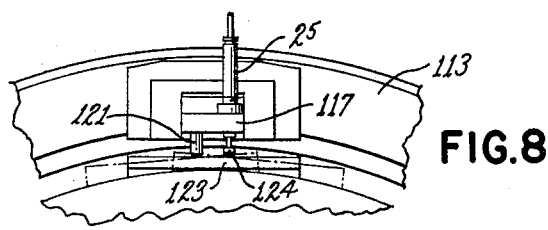
FIG. 6
FIG. 8
INVENTORS
ROBERT L. ESKEN
JOHN H. KNIGHT
ROBERT W. WHITMORE
BY Ernest J. Ily
ATTORNEY

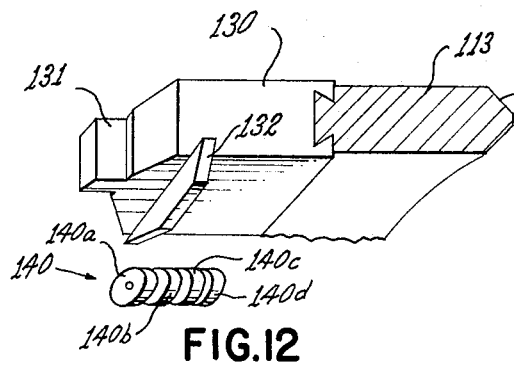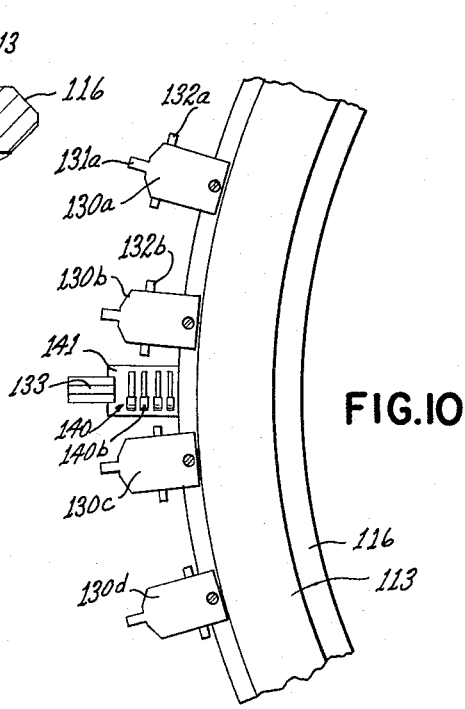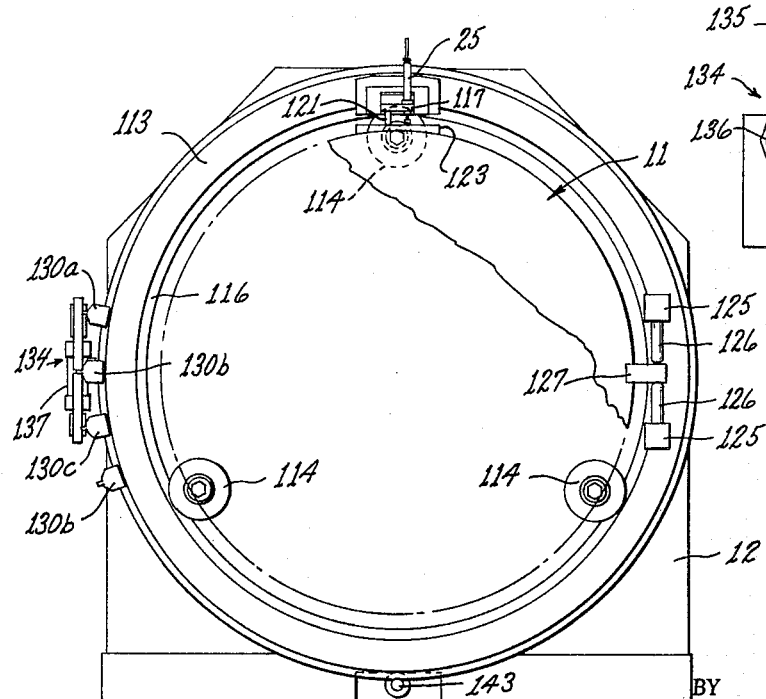

Oct. 25, 1966 R. L. ESKEN ETAL 3,280,607
MACHINE TOOL
Filed Aug. 1, 1963 9 Sheets-Sheet 7

INVENTORS
ROBERT L. ESKEN
JOHN H. KNIGHT
BY ROBERT W. WHITMORE

Ernest J. Hy

ATTORNEY

United States Patent Office 3,280,607
Patented Oct. 25, 1966

3,280,607
MACHINE TOOL
Robert L. Esken, John H. Knight, and Robert W. Whitmore, Dayton, Ohio, assignors to The Sheffield Corporation, Dayton, Ohio, a corporation of Delaware
Filed Aug. 1, 1963, Ser. No. 299,389
23 Claims. (Cl. 72—8)

This invention relates to forming machines and more specifically to a machine for automatically gaging and bending a workpiece to a desired form.

It is an object of this invention to provide a forming machine for bending workpieces to a desired form which have unique features of construction providing advantages in application to a wide range of workpieces including such difficult to form workpieces such as turbine blades and the like.

It is a further object of this invention to provide a forming machine for bending workpieces to a desired form which provides advantages in operation for more rapidly forming workpieces to a desired form with a precision heretofore difficult or impossible to obtain with prior known devices.

A further object of the invention is to provide a forming machine for bending workpieces to a desired form, which machine includes automatic programming and control features for fully automatic and optimum control of forming forces in accordance with deviations in configuration and the basic characteristics of the workpiece itself, and for automatic selective application of such forces as required for full correction or forming of the workpiece in a multiplicity of form determining directions.

A further object of this invention is to provide a forming machine of the character referred to which automatically gages a workpiece to determine the deviation from a desired form, and which includes automatic control and force applying means for applying bending forces of infinitely variable magnitudes and selected direction as determined by the gaging result, thus more readily accommodating variations in workpiece characteristics and, through such infinitely responsive force control, forming such workpieces more rapidly and precisely to the desired form.

A further object of the invention is to provide a machine particularly applicable to correcting an elongated workpiece, for example an elongated turbine blade, to a predetermined form by applying corrective bending forces in mutually perpendicular directions transverse to the workpiece axis and applying corrective twisting forces about the workpiece axis with means for automatically applying these corrective forces selectively or simultaneously and in response to the measured deviation to thereby achieve correction previously not possible.

A further object of the invention is to provide a machine including sensing means for determining the configuration of an elongated workpiece at a plurality of locations therealong to thereby fully determine its deviation from a desired form, and force applying means responsive thereto for applying bending forces which are infinitely variable in magnitude and controlled in direction based on the determined deviation.

A further object of the invention is the provision of a forming machine of the character referred to which includes programming means such as a tape control system for sequentially actuating spaced apart locating means which clamp an elongated workpiece at preselected locations therealong in accordance with a desired bending sequence thereby enabling shaping of the workpiece along its length to an optimum form.

A further object of the invention is the provision of an automatically controlled bending machine which includes means for gaging deviation of an elongated workpiece from a desired form, and a power operated movable head assembly for holding a portion of the workpiece and applying corrective bending forces of infinitely variable magnitude determined as to both magnitude and direction by said gaging means in opposition to locating means spaced from said head assembly along the workpiece.

A further object of the invention is the provision of such a machine having a plurality of locating means selectively operable for clamping and locating the workpiece at selective positions therealong, a freely movable head assembly positioned by the workpiece at a further location therealong in accordance with the workpiece configuration between it and the selected locating means, and gaging means responsive to the head assembly position and thus responsive to the workpiece configuration for controlling force applying means actuating said assembly to bend the workpiece to the desired form.

Other objects and advantages of the invention will be apparent from the following description, the appended claims and the accompanying drawings, to which, FIG. 1 is a perspective view of a machine embodying the present invention, FIG. 2 is a perspective view in more detail of the head assembly, gaging means, and a locating station, FIG. 3 is a sectional view, partially broken away, taken on the line 3—3 of FIG. 2.

FIG. 4 is a front view of a locating station,

FIG. 6 is a section on the line 6—6 of FIG. 1.

FIG. 8 illustrates the operation of the twist gaging components,

FIG. 9 is a view showing a reference ring and associated components,

FIG. 10 is an enlarged view of components associated with the reference ring,

FIG. 11 is an enlarged view of the indexing unit,

Figure 15:
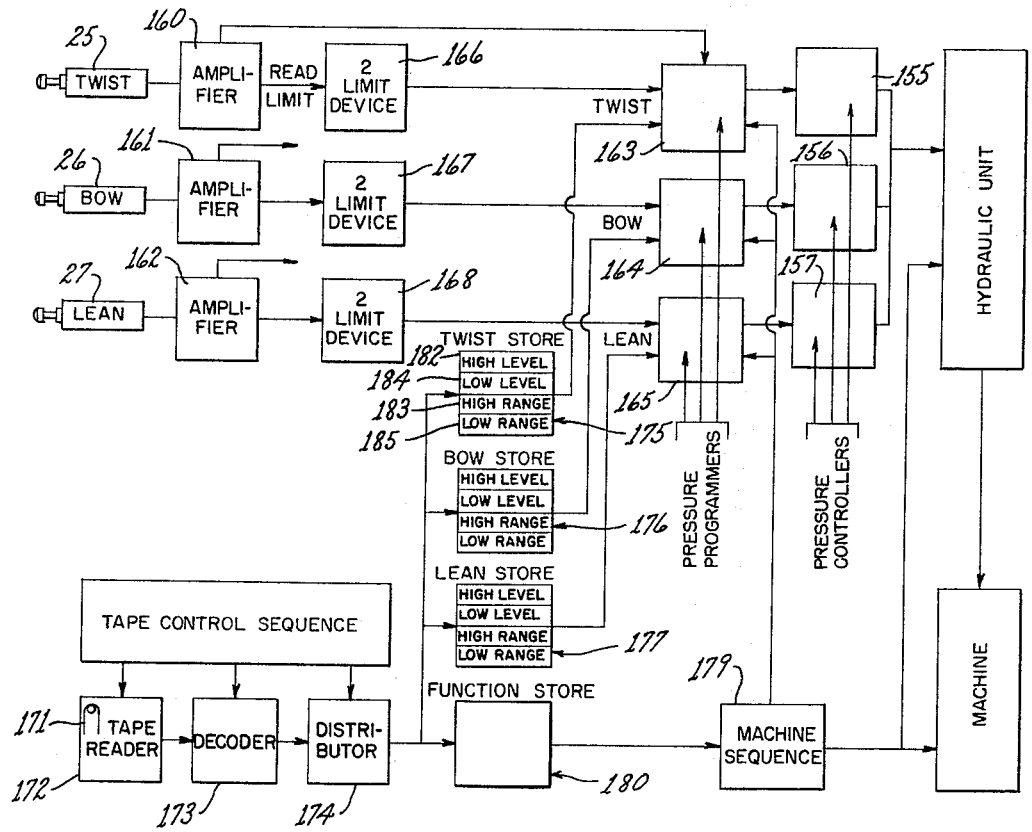
Figure 16:
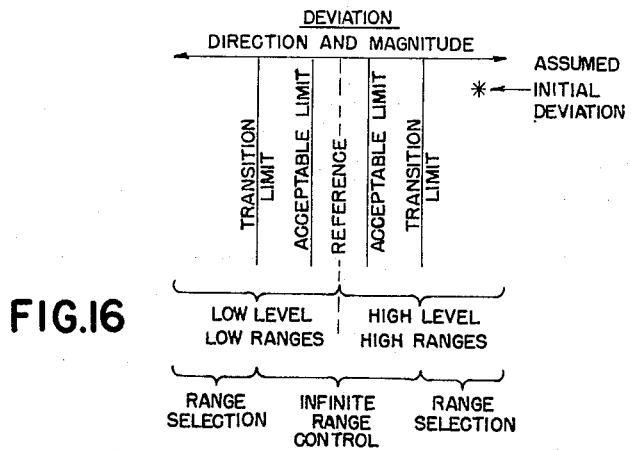
Figure 17:
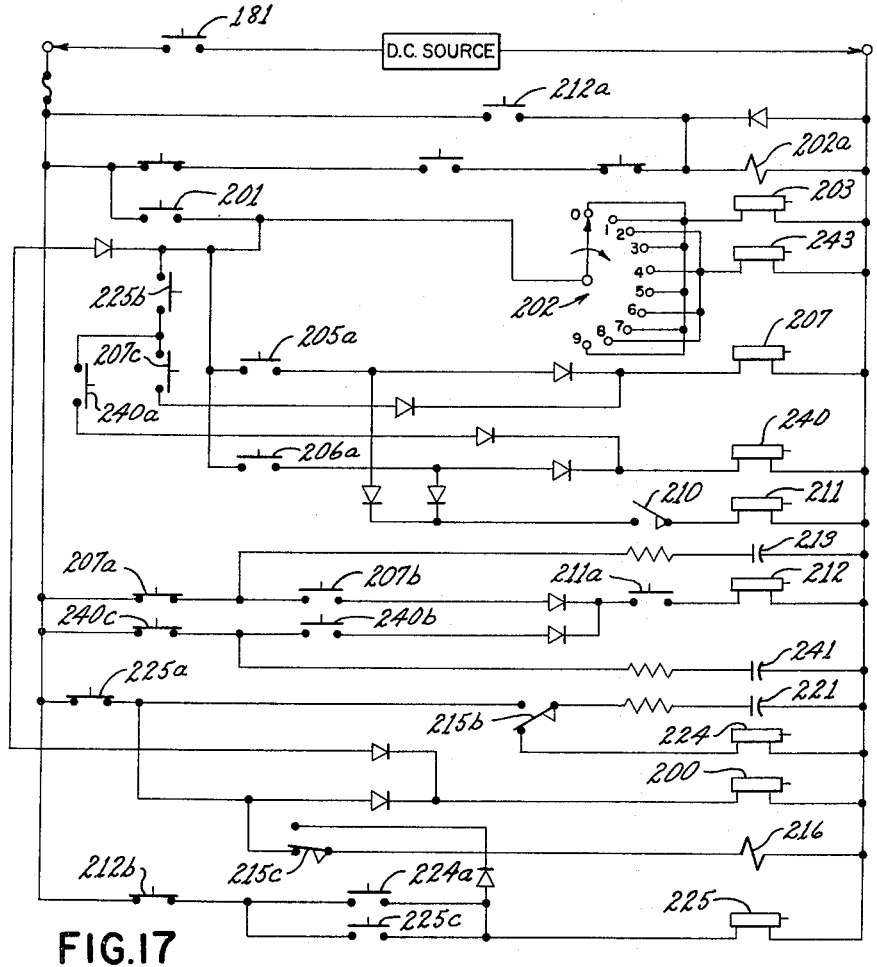
Figure 18:
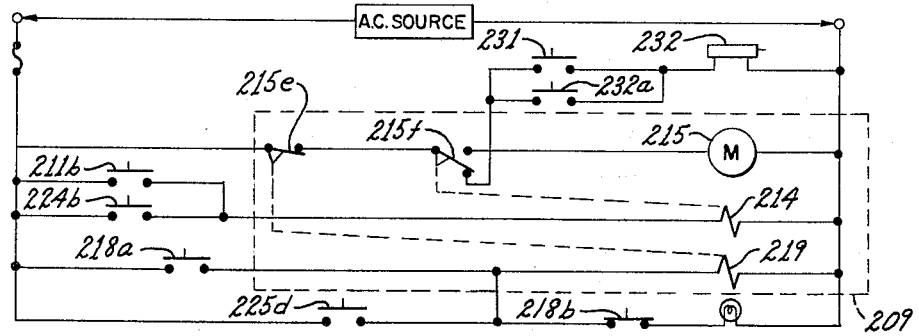
Figures 19, 20:
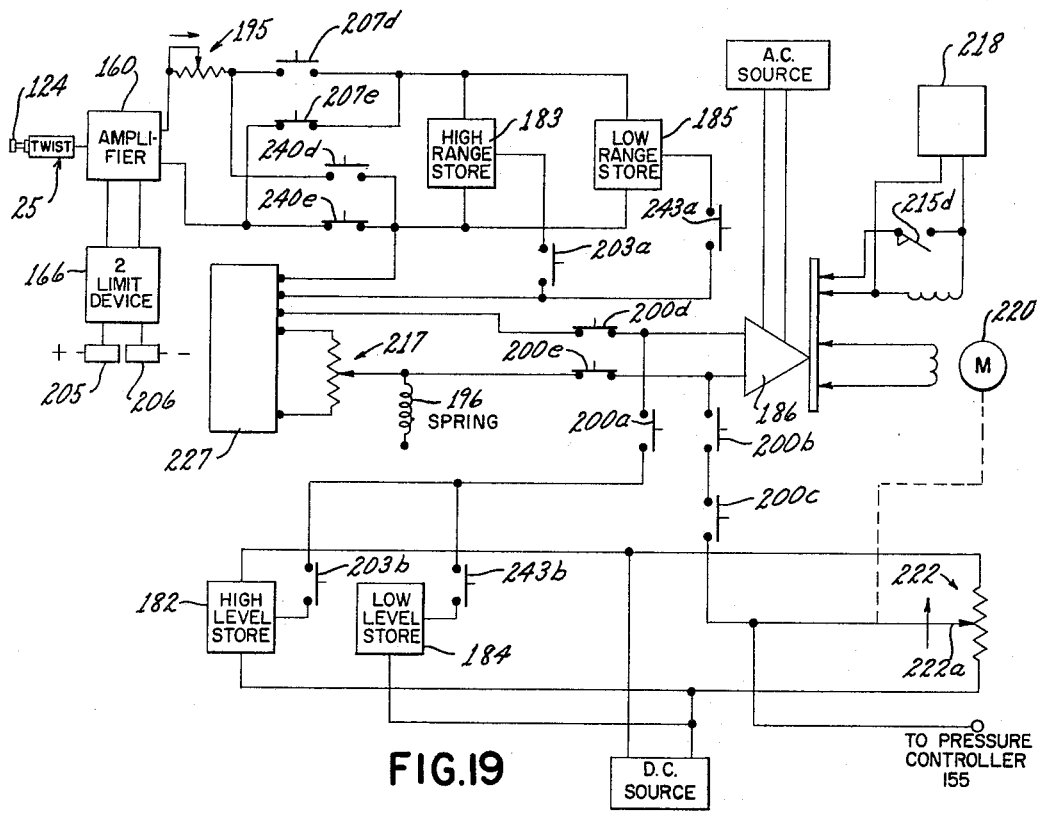

FIG. 12 is an enlarged view showing a carrier, cam, and switch actuating rollers, FIG. 13 is a view showing the arrangement of the bow and lean gaging cartridges and reference stop with parts of the head assembly cut away, FIG. 14 illustrates the operation of the bow gaging cartridge, FIG. 15 is a block diagram of the electrical system, FIG. 16 charts the high and low Level and Range pressure relationships, and operation modes relative to acceptable tolerance limits and mode transition limits, FIG. 17 through 19 illustrate details of certain nonconventional portions of the electrical systems of FIG. 15, and FIG. 20 is a sequence chart of cam timer operation.

While the machine of the present invention is capable of application to varied workpieces its features have been illustrated and will now be described as applied in an illustrative example to correcting deviation from a desired form of a turbine blade such as is used in a steam turbine.

In the illustrated application an end portion of the blade or elongated workpiece is held by a locating means in a known fixed position. Another portion of the blade is firmly held in a balanced head assembly that is freely mounted. The head assembly is thus oriented in accordanec with the blade form between the head assembly and locating means and its position is gaged. To establish gaging reference positions a master is held in the locating means and allowed to displace the position of the head assembly. The gaging means in sensing the displacement of the head assembly from said reference positions thereby senses the deviation of the blade from the desired form and provides a signal to an automatic control system which applies corrective bending forces through the head assembly to the workpiece. Programming means are provided through tape control to establish the machine operating sequence and desired reference force levels.

In the general overall arrangement, illustrated in FIG. 1, the machine includes a base 8 having a plurality of locating means or stations 9a, 9b, 9c and 9d thereon for holding selected portions of the blade 10. The movable head assembly 11 holding the opposite end portion of the blade is freely mounted through a supporting structure 12 on base 8. An operator's instrument panel 14 is provided to enable visual observation of the gaging results and the operation of the control system, and a console 15 is provided for housing components such as drives, motors, valve assemblies, controls and associated equipment. The major components of the electronic system, including punched tape equipment, electrical stores, and associated automatic equipment are located in another console 16.

As shown in FIG. 2, each locating station 9 (indicating generally any one of stations 9a–d) includes clamping means, such as jaws 17 and 18, for rigidly holding the workpiece in a desired position with respect to the base. The root end portion of the blade 10 is rigidly held in the head assembly 11 by a holding means 21 which includes jaws 22 and 23. In the illustrated embodiment of the invention, head assembly 11 is mounted for rotation or swiveling movements about three mutually perpendicular axes intersecting at point 24, illustrated in FIG. 6. With an end portion of the blade clamped by jaws 17 and 18 in any one of locating stations 9a–d and the opposite end portion clamped by jaws 22 and 23, the head assembly is located by the orientation of the blade to a position determined by its configuration.

The basic longitudinal configeration of blade 10 is determined by its deviation from a reference position in three reference directions or senses. "Twist" defines deviations about the longitudinal axis, "lean" is a chordwise deviation and "bow" is a deviation transverse to the chord. Twist is accommodated by rotary displacement of universally mounted head assembly 11, bow by rocking or pivoting movement about a generally horizontal axis, and lean by a similar rocking or pivoting movement about a generally vertical axis—all such axes intersecting at point 24 previously referred to.

A gaging cartridge 25 is provided for indicating rotary displacement of the head assembly from a reference position. Similarly a gaging cartridge 26 is arranged to indicate rocking or pivoting of head assembly 11 caused by bow of the blade; and another gaging cartridge 27 is arranged to indicate displacement of the head assembly caused by lean of the blade. These gages provide electrical signals to an automatic control system to be later described, which automatically commands power means including a rotary actuator 30 to apply corrective bending forces through head assembly 11 to correct the blade for twist, a pair of actuators 31 to apply corrective bending forces to correct the blade for bow, and a pair of actuators 32 to apply corrective bending forces to correct the blade for lean.

Each locating station 9, see particularly FIGS. 3 and 4, includes a support 33. A member 34 fastened to the support 33 enables each locating station to be moved along a track 35 fixed to the base. Track 35 enables each locating station to be moved along the base to predetermined locations, based upon the particular length and desired form of a given blade to be bent, and rigidly fastened along the track in any suitable manner.

Means are provided for retracting the lower clamping jaw 18 when the particular holding station 9 is not in use. In the illustrated embodiment retraction is accomplished by a sliding member or block 36, which is attached to a rod end portion 37 of hydraulic actuator 40. Block 36 slides on bearing surface 41 of support 33, and the forward travel of the block is limited by a suitable stop, illustrated as a screw 42, which is threaded into a bracket 43 fixed to support 33. A tapered cam surface 44 on the block 36 engages a wedge 45 attached to a pivotable link 46. Link 46 is pivoted about a pin 47 supported by a pair of parallel plates 50 on support 33.

In the retracted position block 36 is positioned as illustrated at 51. During a blade clamping action the block 36 is moved toward stop 42 causing surface 44 thereof to engage wedge 45 and thereby pivot link 46 to a predetermined fixed position relative to the base. Link 46 carries blade supporting jaw 18 which is specially contoured to engage the particular form of the blade to be bent.

The upper clamping jaw 17 is brought into engagement with the blade by a toggle action. Jaw 17 is carried by an upper toggle link 52 which pivots about a pin 53 supported by links 54 and 55. Link 54 is attached to a pin 56 movably supported by another pair of plates 57 which pivot about support pin 60 on support 33. Link 55 pivots about fixed pin 47 supported by plates 50.

Pivoted plates 57 are moved about pin 60 by a hydraulic actuator 62 connected to plates 57 through a pin 61. Hydraulic actuators 40 and 62, for jaws 18 and 17 respectively, are pivotedly mounted at their rear ends for movement on pins 63 and 64 respectively mounted on the base, as illustrated in FIG. 2.

Thus it is apparent that upon supplying power to the hydraulic actuators, actuator 40 moves block 36 causing the lower clamping jaw 18 to be positioned upward in a manner as previously described, simultaneously the upper jaw 17 moves in a pincer action downward toward jaw 18 to engage the blade therebetween and hold it in a fixed position relative to the base.

Figure 5:
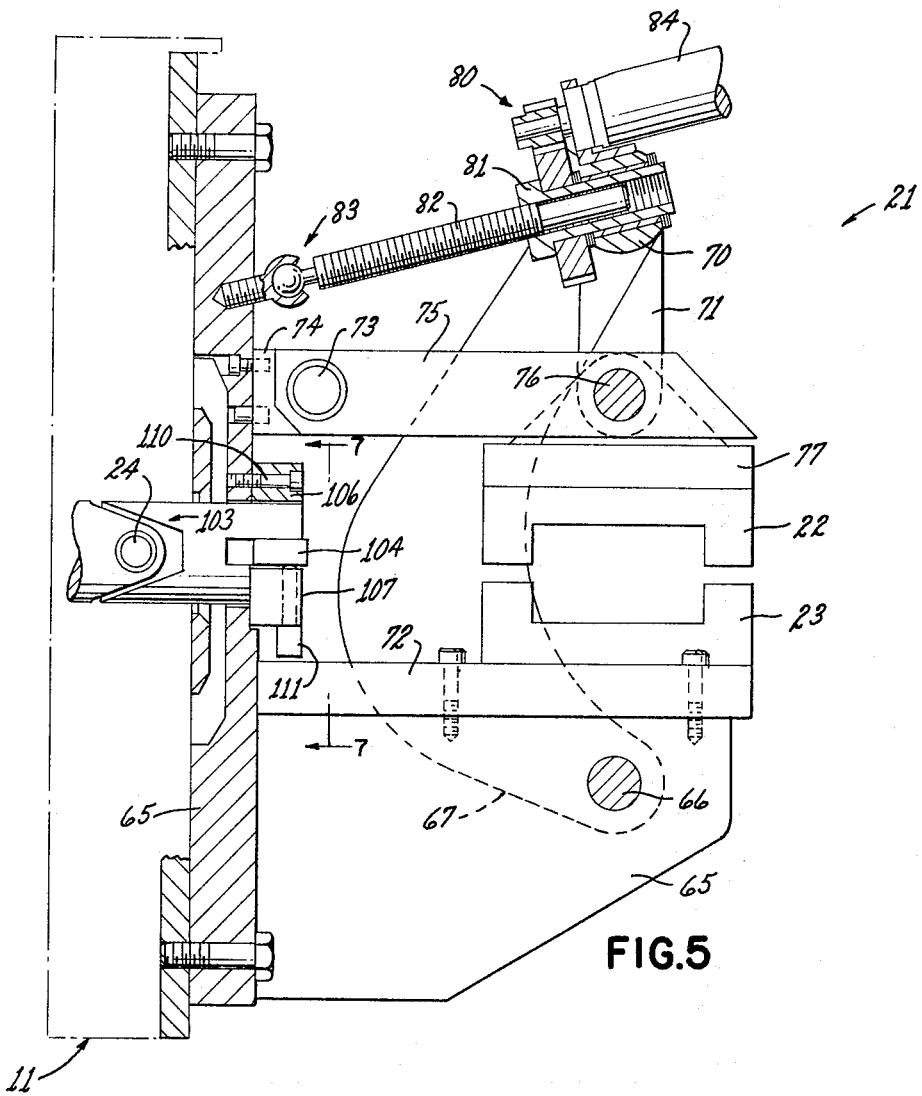
FIG. 5 shows details of the holding means on the head assembly with parts in section and parts cut away.

Head assembly 11 includes the holding means or unit 21, particularly illustrated in FIG. 5, for holding the workpiece end or blade root firmly thereto. Unit 21 includes a pair of plates 65 each having an "L" shaped portion attached to head assembly 11. Pin 66 supported by plates 65 holds a pair of brackets 67 thereto for swiveling movements about the pin. Another pin 70 supported at the opposite end of brackets 67 supports a link 71. Plates 65 have a jaw supporting member 72 fixed thereto. Lower holding jaw 23 is fixed to the supporting member 72.

The upper jaw 22 is supported and moved by a toggle link having pin 66 and a pin 73 fixed to head assembly 11. Pin 73 is supported by a member 74 fastened to plates 65. A link 75 pivots about fixed pin 73 and carries another pin 76. Pin 76 pivotedly carries an upper jaw supporting member 77. The upper jaw 22 is attached to supporting member 77 and may be made in one piece as illustrated or may be constructed in two or more pieces if desired, becaused of reasons of economy, performance, and interchangeability.

A mechanism is provided to enable the blade to be securely fastened in the head assembly through actuation of holding jaws 22 and 23. This mechanism includes a gear train 80 suitably fastened to the unsupported ends of brackets 67 which drives a special nut 81 having a threaded female portion engaging a screw 82 and an outside gear for meshing with gear train 80. The opposite end of the screw is connected to head assembly 11 for swiveling movements through a ball joint 83. The gear train may be powered manually or, as illustrated, may be driven by a reversible rotary pneumatic actuator 84 fastened to brackets 67.

To clamp the blade in the head assembly it is manually placed on lower jaw 23. Actuator 84 is then energized causing nut 81 to be driven down screw 82 by the gear train 80 thereby pivoting brackets 67 about pin 66 and link 75 about pin 73 to cause jaw 22 to be moved in a pincer movement toward stationary jaw 23 and thus clamp the blade therebetween. With the blade root firmly held in holding unit 21 it and the head assembly are fixed for movement together.

The head assembly 11 is free to rotate and pivot about point 24 illustrated in FIGS. 5 and 6 as previously described, and is engageable by rotary actuator 30 and by pairs of actuators 31 and 32 for the application of bending forces. Each actuator of pair 31 has a rod end 85 with a "T" connection 86 pivoted thereon for actuating the head assembly. Similarly, each actuator of pair 32 has a rod end 87 with a "T" connection 90 pivoted thereon for actuating the head assembly. Each "T" connection has rollers at each end such as that indicated at 91 in FIG. 6 to allow rotation of the head assembly with respect thereto. The rod ends 85 and 87 extend through an annular slot 92 in the rear wall of the head assembly provided to allow rotary movements of the head assembly with respect thereto. The "T" connections are narrower than the corresponding transverse dimension of annular space 93 so that relative clearance can be provided on both sides to prevent obstruction of the head assembly during gaging while enabling application of force to the head assembly 11 through the "T" connections during bending. Because "T" connections 86 and 90 are pivoted on the rod ends they will position themselves to apply force through both rollers of each connection irrespective of the position of the head assembly.

To assure that each "T" connection is in the center of annular space 93 during gaging each actuator of pair 31 has a rod end 94 which carries a cam 95. Likewise each actuator of pair 32 has a rod end 96 which carries a cam 97. Each cam 95 and 97 cooperates with a pair of electric limit switches 100 and 101, respectively attached on the base. Each cam is adjusted on its respective actuator rod midway between the respective cooperating pair of limit switches with each "T" connection 86 and 90 having clearance relative to annular space 93 and with head assembly in a reference position. Conventional electrical control means responsive to the switches and controlling actuating pressure are provided to move each actuator so that both switches are disengaged prior to each gaging and force applying cycle to assure that during the gaging portion of the cycle each "T" connection has clearance within annular space 93 and thereby keep the head assembly freely movable. With a blade within normal expected deviations this clearance will be obtained during each of the sequential gaging cycles. With a blade of greater initial deviation this clearance will be obtained during later gaging and force application cycles as the blade is brought within the range of normal deviations.

Figure 7:
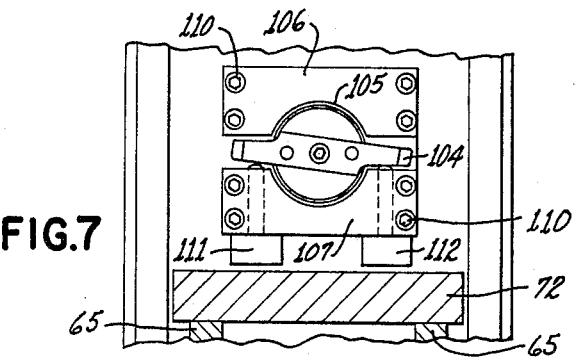
FIG. 7 is a section on the line 7—7 of FIG. 5.

Rotation of the head assembly and hence the application of rotary forces to correct the twist of the blade is achieved by rotary actuator 30 as previously mentioned. The rotary actuator has a shaft 102, illustrated in FIGS. 6 and 7 attached to a universal joint 103. The universal joint has a "T" bar 104 attached thereto for engaging the head assembly. Clearance is provided at 105 within the head assembly to enable the universal joint to extend therethrough without interference. Bearing plates 106 and 107 are fastened to the head assembly by bolts 110 and are engaged by the "T" bar to produce rotary movement of the head assembly.

A pair of electrical limit switches 111 and 112 are mounted on the head assembly 11 to engage the ends of the "T" bar, and when either of them is engaged by the "T" bar it signifies that the head assembly is obstructed against free positioning by the resistance offered by rotary actuator 30. Conventional control means are provided responsive to engagement of either of switches 111 or 112 to move the rotary actuator in the necessary direction to obtain disengagement so that both switches are disengaged prior to a gaging cycle and the head is free.

Gaging means are provided to gage the deviation of the head assembly from a normal or reference position preferably comprising means for gaging movement of the head assembly without imposing accuracy destroying forces thereon. An electrical gaging element of the type used in the illustrated example is disclosed in Patent No. 2,833,046.

As previously stated, the gaging means measure twist, bow, and lean of the blade by measuring the position of the movable head assembly relative to the base. The gaging means for measuring twist as illustrated is comprised by a gaging cartridge 25, the body of which is fixed to a rotatable ring 113, illustrated in FIG. 6. The ring 113 is supported by three spaced rollers 114 fastened to structure 12. The rollers have a "V" shaped groove 115 for engaging cooperating angled surfaces 116 on the ring to thereby enable the ring to be freely rotated while being held vertically with respect to the base 8.

An arm 117 pivoted about pin 120 on ring 113 carries gaging cartridge 25 as well as a fixed stop 121 (see the upper portion of FIGURE 6 and FIGURE 8). A spring 122 urges arm 117 clockwise as seen in FIG. 6 to maintain stop 121 against reference plate 123 which is positioned in accordance with rotary movements of the head assembly. Thus, as seen in FIG. 8, work engaging plunger 124 is moved within gaging cartridge 25 to signal the rotary head position while arm 117 can pivot vertically so stop 121 follows plate 123.

With a master blade held in the head assembly and with the blade respectively clamped at each locating station the reference stop 121 is brought into engagement with plate 123 and gaging cartridge 25 is adjusted in arm 117 so that contacting plunger 124 is at the midpoint of its gaging travel to define the reference signal for that station. For example, if the reference position of plate 123 with a master blade were generally horizontal any twist deviation of the blade would cause displacement of plunger 124 relative to stop 121 as shown diagrammatically in FIG. 8. With the plunger 124 installed on one inch centers from the reference stop 121, the tangent of the angle of deviation is indicated directly.

Any given blade has an inherent curvature or twist along its length and with the blade clamped at different ones of spaced locating stations 9 this causes the head assembly to rotate different amounts thus defining different rotary reference positions of the head assembly depending upon which locating station is employed.

The twist reference gaging positions are established by (FIG. 9) coupling ring 113 to head assembly 11 by energizing a pair of solenoids 125 on ring 113 to extend their plungers 126 into coupling engagement with opposite sides of projection 127 on assembly 11 and allowing ring 113 and head assembly 11 to be simultaneously rotated by a master blade as it is held in each respective locating station and in the head assembly. The positions to which the ring and head assembly rotate with a master blade in position, establish the reference positions for ring 113 for each of the locating stations. As illustrated in FIGS. 9, 10, and 11, a carrier 130, four of which are indicated at 130a, b, c, and d, corresponding to locating stations 9a, b, c, and d respectively, adjustable on ring 113 is provided for each reference position. Each carrier 130 has a positioning tab 131 extending radially therefrom and a switch actuating cam 132. During setup in conjunction with a master blade, as each of the locating stations 9 is employed, the respective carrier 130 is manually positioned and clamped to ring 113 with its tab 131 in alignment with a locating stop 133 fixed on the base. Thus when each tab 131 is brought to this reference position, ring 113 and the gaging cartridge it carries are properly positioned to gage twist deviations for the particular locating station 9 being employed.

An index unit 134 holds the ring 113 in positions determined by the positions of carriers 130 along the ring. It comprises a pair of arms 135 which are mounted for movement about a pin 136 fastened to the upright portion of the base. The arms are moved toward and away from each other in a scissors action by an air cylinder 137 attached to supporting structure 12 and fastened to each arm. With ring 113 free, as arms 135 are moved toward one another, they engage the tab 131 of the respective carrier 130 and move the tab into alignment with stop 133, thereby establishing the reference gaging position for that locating station.

With a blade to be bent rigidly held by the head assembly, the head assembly is rotated either clockwise or counterclockwise as initially determined. To assure that ring 113 follows the initial movement of head assembly before a locating station is initially engaged, or when shifting between locating stations, plungers 126 of solenoids 125 are engaged with projection 127 fastened to the head assembly.

After the machine has been set up in conjunction with a master blade, in an actual correcting operation, the first step is when the tape signal causes the head assembly 11 and ring 113 coupled thereto to rotate in the direction programmed until one of carriers 130a, b, c, or d engages a corresponding one of switch actuating rollers 140 extending from switch housing 141. As seen in FIGS. 10 and 12, cams 132 are radially displaced from one another and a roller 140 is positioned in the path of each respective cam. Under tape control, head assembly 11 and ring 113 will be driven until the desired cam 132 engages its respective switch actuating roller 140 signalling that the desired reference position has been reached. As cam 132b engages roller 140b, for example, the head assembly is stopped and electrical circuits are energized through actuation of roller 140b and its associated switch to cause indexing unit 134 to be actuated, deenergize solenoids 125 to release the ring from the head assembly, and actuate a locating station (9b in this example) to grasp the blade at the prescribed station. Clamping of blade 10 at station 9b orients the blade and head assembly 11 as previously described and with the index unit 134 holding the ring 113 at a reference position gaging takes place and deviation signals are provided. Following gaging, corrective bending forces are applied to correct the amount of blade deviation from the reference position. Ring 113 is released by index unit 134 and is driven to follow head assembly 11 during application of bending forces to prevent any damage to machine components. To assure that ring 113 follows rotation of head assembly 11 during twist correction, cartridge 25, which essentially senses the relative position of the ring and head assembly, continuously provides a signal during bending to a servo motor 142 to start the motor and drive the ring in the direction corresponding to the direction of rotation of the head assembly. Servo motor 142 is mounted on the upright portion of the base and has a friction wheel 143 mounted on its shaft which is in friction contact with the ring at all times. Following the application of the bending forces head assembly 11 rotates in the opposite direction due to springback in the blade 10 and thus with springback, cartridge 25 energizes servo motor 142 in an opposite direction. Upon reversal of direction of rotation of the head assembly the ring is driven until cam 132b engages roller 140b at which point the indexing unit is energized as previously described.

The clamps of the effective locating station 9b remain engaged, and solenoids 125 remain deenergized enabling cartridge 25 to then, with ring 113 held in its reference position, gage the position of the free floating head assembly 11 in preparation to another application of bending forces if necessary as determined by the gaging result. As bending forces are again applied the sequence of operation of the servo motor is repeated until the blade is bent to the desired form. The sequence is repeated at each locating station.

The gaging means for measuring bow and lean operate in an identical manner and comprise gaging cartridges 26 and 27, having movable work contacting plungers 144 and 145 respectively, both of which are mounted on a piston 146 as illustrated in FIGS. 13 and 14. Piston 146 carries reference stop 147 and gaging cartridges 26 and 27 for movement therewith. Piston 146 is yieldingly urged within cylinder 150 toward head assembly 11 as by air pressure to cause stop 147 and plungers 144 and 145 to maintain continuous engagement with the head assembly. To establish the reference positions for bow and lean deviation of the blade, the master blade is clamped at a locating station 9 while being held in the head assembly and cartridges 26 and 27 are adjusted axially on piston 146 to obtain reference gaging signals.

Any deviation in the lean and bow gaging signals at different locating stations is compensated by adjusting the clamping means of the stations so that the same signals are obtained with a master blade in position and each locating station separately employed. If the blade deviates in one of two bow directions, it will cause the head assembly 11 to be tilted to a position illustrated at 151, depressing contacting member 144 relative to reference stop 147. Gaging cartridge 26 will then provide an electrical signal in accordance with the amount of deviation to initiate the application of correcting bending forces controlled as to direction and magnitude.

Similarly, if the blade deviates in the lean direction, gaging cartridge 27 indicates the deviation relative to stop 147 and provides a signal in a similar manner as described with regard to bow. In the illustrated embodiment work contacting plungers 144 and 145 are respectively arranged vertically above and horizontally displaced from stop 147 and each is spaced one inch therefrom so that the tangent of the angle of bow and lean deviation is indicated directly. Gaging cartridges 26 and 27 provide infinitely variable gaging signals depending upon displacement of the head assembly from the desired form. These signals along with the signals provided from the twist gaging cartridge 25 enable correction of the blade to the desired form.

When the blade has been properly formed, a drilling station 152 is used to drill a reference hole transversely through the blade adjacent to its tip. A reference line is scribed along the blade surface adjacent to its root by structure not shown. This hole and line provide reference markings for properly locating the blade in subsequent operations.

As previously mentioned, the present invention provides a machine for automatically applying bending forces in opposition to the deviation and infinitely controlled as to magnitude based upon the amount of deviation of the blade from the desired form. In the illustrated embodiment infinite control of pressures is employed after the blade has been brought within predetermined transition limits by incrementally controlled pressures. Furthermore, for each locating station the forces may be applied to correct twist, bow, or lean individually and in any desired order or in any combination of the three simultaneously to thereby achieve the desired corrections efficiently and with high speed and precision.

The general magnitude of forces to be applied can be predetermined by empirical data based on experience with the particular type blade to be bent. These forces are applied through conventional pressure controllers 155, 156, and 157 for twist, bow, and lean, respectively. The pressure controllers are responsive to automatic control means or systems which receive signals from amplifiers (FIG. 15) 160, 161, and 162 which amplify the gaging signals from gaging cartridges 25, 26, and 27 respectively. The automatic control system also includes pressure programmers 163, 164, and 165 for twist, bow, and lean, respectively, and two limit devices 166, 167, 168 for twist, bow, and lean respectively.

In the application to be discussed, forces to be applied to the blade are automatically determined by selecting one of two basic high and low pressure "Levels." A selected number of equal pressure increments or high "Ranges" can be added to the high "Level" to obtain a desired force application. A selected number of equal pressure increments of smaller magnitude, designated as low "Ranges," can be similarly added to the low "Level."

Within predetermined transition limits of deviation Range pressure is infinitely controlled. FIG. 16 diagrammatically illustrates the relationship between transition and acceptable limits, Level, Range, and infinite pressure control, relative to the gaged direction and magnitude of deviation from reference.

The direction of initial force application for a given axis is determined by the respective gaging signal from the gaging cartridge provided to two limit device 166, 167, or 168 as the case may be. Limit devices 166, 167, and 168 respectively establish acceptable plus and minus limits for blade configuration in twist, bow, and lean. Each such acceptable limit lies within a transition limit, established by structure to be later described, within which pressure control is changed from incremental to infinite modes. If the deviation and signal is outside the transition limits, then the first pressure application is made of a high Level plus a high Range increment. If the signal indicates the blade is within the transition limits, then the first pressure application is a high Level plus a partial Range pass which is infinitely controlled depending upon the deviation of the blade. Assuming that the respective gaging cartridge signals a blade outside of the transition limit, and an initial high Level plus a full high Range of pressure is insufficient to bend the blade to the desired reference form, additional high Ranges are successively added with each correcting force application until the blade is corrected within the predetermined transition limits for twist, bow, or lean, respectively. Once within said limits the range increment is infinitely controlled as previously mentioned.

The low Level pressure and low additional Ranges are similarly employed in opposition to the deviation but only when the deviation has been reversed through the application of excessive combined high Level and high Range pressures. While the pressure employed will be determined by each particular application, in one exemplary application Level pressures of the order of several hundred pounds per square inch and Range pressures of less than one hundred pounds per square inch have been used.

To accomplish correction of a blade automatically, the blade is first manually placed in the head assembly and rigidly held by jaws 22 and 23.

Referring particularly to FIG. 15 a suitable programming device such as a tape 171 having necessary information punched thereon to enable correction of the blade automatically, is provided for operation in console 16. A conventional tape reader 172 is provided for reading the information from the tape, and a decoder 173 changes the information punched on the tape to a useable electrical output. A distributor 174 is provided for taking said useable electrical output and supplying it to modules including function store 180 and pressure stores 175, 176, and 177 for twist, bow, and lean. The pressure stores retain in a conventional manner the electrical signals which predetermine the magnitude of both high and low Level pressures for each axis as well as the magnitude of the Range pressures for each axis. The function store 180 preselects the locating station to be used first and the order of use of the remaining stations in accordance with signals initially provided by the tape input. The function store also preselects the sequence of force applications at each locating station and may start with either twist, bow, or lean, or any combination of the three simultaneously.

The various stores provide electrical signals to the pressure programmers, 163 for twist, 164 for bow, and 165 for lean, which are all housed in console 16. The signals from the various stores cooperating with signals from gaging cartridges 25, 26, and 27 for twist, bow, and lean respectively comprise the electrical inputs to the machine system which in turn provides output signals for machine operation including station selection, direction of force application, and magnitude of corrective forces applied to the blade. Basically, each pressure programmer 163, 164 or 165, receives the amplified signal from the respective gaging cartridge through the respective limit device 166, 167, or 168 which establish the plus and minus limits within which the blade is acceptable. Pressure controllers 155, 156, and 157 transduce the electrical signal from the respective pressure programmers to a corresponding hydraulic pressure supplied to the various actuators.

The detailed operation of the automatic control system including its new and novel features of providing an infinitely variable output based upon the deviation of the blade from the desired form will now be described as applied to the twist axis with particular reference to FIGS. 17 through 20 in which the electrical circuit for the twist function is illustrated. The control systems for the bow and lean axis operate in the same basic manner, as do the electrical components for providing and amplifying a gaging signal, for controlling and for actuating each respective power means. Prior to starting the automatic cycle tape 171 is cycled through its sequence, storing the information programmed thereon in its respective stores as previously discussed. The tape travels to its End of Block (EOB) point where it comes to rest.

To activate the circuit a switch 181 is closed to supply power to control relay 200 through normally closed contacts 225A. Relay 200 then closes contacts 200a, b, c, and opens contacts 200d and e. Actuation of these contacts allows the high and low Level pressure stores 182 and 184, which retain information provided by the input from tape 171, to be subsequently used as the machine proceeds through the automatic cycle. Electrical signals supplied from the tape 171 in console 16 establishing the bending pressure application sequence have previously been stored in the function store module 180 and have signalled that the twist axis of the blade is to be corrected.

A signal from the EOB point of the tape 171 closes contact 201 to supply power through stepping switch 202 (actuated by coil 202a) and energize control relay 203. Control relay 203 closes contacts 203a and 203b thereby activating the high Level store 182 and the high Range store 183.

Plus or minus deviation in twist is signalled by the direction and amount by which plunger 124 moves with respect to reference stop 121. Depending upon whether the blade has a plus or minus deviation relay 205 or 206 is respectively energized, through limit device 166.

Assuming a plus twist deviation, relay 205 is energized to close contacts 205a energizing relay 207 which opens contacts 207a and 207e and closes contacts 207b, 207c, and 207d. Contacts 207d and 207e set up the correct polarity for the incoming signal from amplifier 169 and thereby assures that the pressure controller adds a pressure corresponding to the signal.

After control relay 207 is energized, a switch 210 is automatically closed from the machine sequence module 179 to energize a control relay 211 for a brief moment as predetermined by the machine sequence.

Energizing relay 211 closes relay contacts 211a and 211b for the brief time that 211 is energized. Closing of contacts 211a momentarily energizes relay 212 through a capacitor 213. Momentarily energizing relay 212 closes contacts 212a and causes stepping switch 202 to move to the number one position thereby maintaining relay 203 energized and the high Level store activated.

Closing contacts 211b energizes a solenoid 214 which actuates a switch 215f to release a lock on the start position of a conventional cam timer 209 and thereby start cam timer motor 215 rotating through its cycle. As the cam timer motor 215 rotates, cam swtiches 215b, c, and d are selectively actuated in accordance with the time cycle illustrated in FIG. 20.

Cam switch 215c is actuated first, deenergizing clutch winding 216 which mechanically disengages a potentiometer 217 from servo motor 220.

As the cam timer motor 215 continues to rotate, cam switch 215d is actuated next to energize servo motor 220. Null detector 218 is simultaneously energized and opens contacts 218a and 218b. Cam switch 215b is then actuated to apply a voltage to and charge a capacitor 221 for use later in the cycle. The cam timer motor 215 continues to rotate to the null lock release position opening a cam switch 215e which deenergizes cam timer motor 215.

Servo motor 220 drives a potentiometer 222 having a movable wiper 222a until the voltage drop across the potentiometer wiper 222a equals the drop across the high Level store 182. At this point the circuit is nulled, motor 220 stops, and null detector 218 is deenergized. Motor 220 stops even though contact 215d remains closed because a differential signal is no longer imposed across the motor windings. Contacts 218a and 218b then drop back to their originally closed positions. An initial Level setting of potentiometer wiper 222a is thus determined in accordance with the high Level pressure initially read into store 182 by the tape input.

Switch 218a energizes solenoid 219 at the null lock position in the cam timer 209 which closes switch 215e and energizes cam timer motor 215 through switch 215f previously closed and allows the cam timer to leave the null lock position and start toward the start lock position. Now that the high Level pressure signal has been introduced in the system the cam timer 209 rotates to its start position to introduce either a full or partial high Range pressure signal depending upon the gaging signal previously supplied to the system.

The signal from output potentiometer 222 is continually fed to the pressure controller 155, however, bending forces are not applied to the blade until after a full or partial Range pressure increment is added as will be subsequently described.

As the cam timer rotates toward the start lock position cam switch 215d is opened to assure servo motor 220 does not move potentiometer 222 until the system has shifted to the high Range store 183. Switch 215b is deactuated next to remove the source voltage from capacitor 221 enabling its stored energy to initially energize relay 224 for a time determined by said stored energy. The action of relay 224 will be subsequently described.

Energizing relay 224 commences a high Range pass by closing contacts 224a and 224b. Closing contacts 224a energizes relay 225 through contact 212b. Energized relay 225 opens contacts 225a and closes contacts 225b, c, and d. Relay 225 is kept energized through contacts 225c because as capacitor 221 discharges, relay coil 224 is deenergized opening contacts 224a and b. Opening contacts 225a removes voltage from cam switch 215b, prevents relay 200 from energizing and reading the level storages, and prevents a circuit to clutch coil 216 from being completed. Closing contacts 225b maintains voltage on relay 207 through contacts 207c. Closing contacts 225d essentially removes the null lock position of the cam timer by keeping a circuit closed to null lock position solenoid 219 in the cam timer 209. The null lock position is not used during Range passes because excessive error in the blade may prevent the Range potentiometer 217 from reaching null and thereby prevent the cam timer from being released from the null lock position. Opening contacts 225a deenergizes relay 200 causing contacts 200a, b, and c, to open and normally closed contacts 200d and e to close, thereby switching the input of the amplifier 186 to Range potentiometer 217 and high Range store 183 through a Range balancing network illustrated at 227.

At this point of the cycle, the cam timer sequence previously described for Level is repeated for Range because contacts 224b are still closed thereby maintaining cam timer solenoid coil 214 energized at the start lock position. The cam timer motor 215 continues to rotate and actuates cam switch 215c, refer to the dotted line in FIG. 20, which energizes clutch coil 216 through contacts 212b and 225c to mechanically engage Range potentiometer 217 to output potentiometer 222 so that potentiometer 222 will be simultaneously adjusted with potentiometer 217.

Potentiometer 222 adds to its initial Level setting values of subsequent Range passes represented by full value of potentiometer 217 for signals outside or beyond the transition limits or partial values of potentiometer 217 for infinite range control within these limits.

As the cam timer motor continues to rotate cam switch 215d is closed to energize servo motor 220. The servo motor drives Range potentiometer 217 (and output potentiometer 222 which was coupled thereto as previously described) attempting, through balancing network 227, to balance the input deviation signal. If the error signal is greater than the capability of potentiometer 217, potentiometer 217 will be run to its maximum point and stop even though the network cannot balance with output potentiometer 222 being further adjusted by a full high Range increment in addition to its previous high Level setting. This feature is provided because as previously described, closing contacts 225d prevents the operation of the null lock position of the cam timer.

As the potentiometers sweep, cam timer motor 215 continues to rotate and simultaneously with the running of potentiometer 217 to its maximum point cam switch 215d is then deactuated deenergizing servo motor 220. As the cam timer motor continues to rotate, cam switch 215c is deactuated to deenergize clutch coil 216 to mechanically disengage Range potentiometer 217 from Level potentiometer 222. Spring 196 returns the wiper of potentiometer 217 to its starting position when clutch coil 216 is deenergized thus setting up the potentiometer for its next Range pass.

The cam timer motor continues to rotate to its home or start lock position deactuating switch 215f which deenergizes cam motor 215 to stop the cam timer. Switch 215f can only be deactuated if both sets of contacts 224b and 211b are open, deenergizing solenoid 214. Contacts 224b are open during Range cycle and contacts 211b are always open except at the beginning of a new cycle when they are closed from the machine sequence.

After a bending force application cam timer 209 is energized again from the machine sequence to start another cycle.

The pressure controller 155, a conventional electric to hydraulic transducer, is connected to the output of potentiometer 222, as illustrated in FIGS. 15 and 19, and has an electrical balancing circuit therein for providing an infinitely variable hydraulic pressure to the hydraulic actuators based upon the electrical input signal. When its circuit has balanced or nulled against the output of potentiometer 222 its null contact 231 is closed and with switch 215f deactuated to its lower position (which occurs only after a full, or partial sweeping of potentiometer 217) relay 232 is energized to close contact 232a and maintain voltage to relay 232 to keep it energized.

Relay 232 provides a signal to initiate operation of rotary actuator 30 in this twist example to apply corrective bending forces to the blade at the force level established by pressure controller 155. After the application of the forces the machine gages again as previously described. If the blade is still not within the desired form the sequence is repeated applying additional Range pressures and reapplying forces in the same manner. In each cycle the wiper of potentiometer 217 will sweep fully adding a full Range increment, unless a null is obtained in balancing network 227 during sweeping in which case potentiometer drive motor 220 stops and a fractional Range increment is added to the previously applied Level and Range pressures. The force is then reapplied. This provides infinite force control when the amount of deviation signaled by cartridge 25 is within the range of balancing of potentiometer 217. This occurs within the transition limits. If at any time the gaging signal is within the acceptable limits established by limit device 166 relays 205 and 206 remain deenergized and the cycle is terminated for the twist axis. Correction then commences in a similar manner for the next axis as determined by a signal from function store 180.

The bending operation has been discussed with a plus tolerance blade; however, if a minus tolerance blade were indicated by gaging cartridge 25 a signal through amplifier 160 would energize relay 206 in two limit device 166 for energizing contacts 206a instead of 205a as previously discussed to thereby energize a control relay 240 slaved to minus tolerance contacts 206a. This determines the direction of force application and insures that it is always in opposition to the deviation. Energized relay 240 closes contacts 240a for use later in the cycle, closes contacts 240b, and opens contacts 240c setting up a circuit to enable a capacitor 241 to momentarily energize relay coil 212 as contacts 211a are closed later in the cycle. Energizing relay 240 also closes contacts 204d and opens contacts 240e to set up the correct polarity of the incoming signal from the gaging cartridge.

At the same time relay 240 is energized, switch 210 is closed from the machine sequence to energize control relay 211 for a brief time as determined by the machine sequence to thereby close contacts 211a and 211b for said brief time. Closing contacts 211a complete a circuit from capacitor 241 to relay coil 212 momentarily to energize relay 212 and close contacts 212a to cause step switch 202 to move to the number one position while maintaining control relay 203 energized.

Closing contacts 211b completes a circuit to solenoid 214 in the cam timer 209. Solenoid 214 energizes switch 215f to energize cam timer motor 215 and start the machine through an automatic cycle as previously described.

In the event the blade is over-corrected for example from a plus to a minus deviation by the application of high Level and high Range pressure (a condition referred to as crossover) gaging cartridge 25 provides a corresponding signal to relay 206 in two limit device 166 to start operation of the control system as previously described in connection with an initially minus blade and energize relay 212 through capacitor 241 as well as relays 211 and 240. These relays are energized in their proper order as previously described and cause step switch 202 to move to the next position, in this instance the number two position. As previously discussed, energizing relay 212 opens contacts 212b thereby removing power from relay 225 to cancel the memory in the circuit and hence the previously made contacts to the high Level store 182 and high Range store 183. With the step switch in the number two position a relay 243 is energized closing contacts 243a and 243b thereby activating low Level store 184 and low Range store 185. The pressure programmer 163 continues through its cycle exactly as previously described for high Level and high Range; however, it applies the low Level and low Range values from twist store 175.

If the blade is now (or earlier in the bending sequence) over-corrected from a minus to a plus side, gaging cartridge 25 provides a corresponding signal to relay 205 in two limit device 166 to start operation of the control system as previously described in connection with a plus blade including energizing relay 212 through capacitor 213, in this instance, as well as energizing relays 207, and 211, in their proper order causing step switch 202 to move to the next position, in this example the third position. As previously discussed energizing relay 212 opens contacts 212b to remove power from relay 225 to cancel the memory in the circuit and hence the previously made contacts in this instance to the low Level store and low Range store.

Each stepping action of switch 202 caused by crossover from a plus to a minus blade, and vice versa, alternates the system between the high and low pressure stores. When a predetermined number of crossovers occur the machine is set up to automatically stop thereby signifying the blade is to be rejected. The relationship between high and low Ranges and high and low Levels is basically determined by the tape input to the system. However, manual modification of the input signal from cartridge 25 is possible through adjustment of potentiometer 195 to effectively vary the Range references if desired.

Thus it is seen that a machine is provided for bending an elongated workpiece to a predetermined form with precision and in an efficient manner. Bending is accomplished by clamping the workpiece at a first location therealong and holding it in a freely movable head assembly at another location spaced from said first location. The workpiece is gaged by gaging the position of the head assembly from a reference position established by a master having a desired form and its deviation from the desired form is determined. Corrective bending forces which are infinitely variable in magnitude to correspond to the deviation of the workpiece from the desired form are applied thereto to correct said workpiece. These corrective bending forces are applied in predetermined directions sequentially or may be applied simultaneously to enable, through the individual force controls, the application of a single resultant force of effectively infinite variation in direction governed by the deviation of the workpiece in three mutually transverse directions or senses from the desired form. Thus a unique machine having material advantages in mechanical arrangement and in operation has been provided, making possible forming operations heretofore difficult or impossible to achieve and with material gains in efficiency and precision.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine for bending a workpiece to a desired form comprising,
    a base,
    locating means on said base including clamping means for engaging said workpiece at a first location thereon for rigidly locating said workpiece relative to said base at said first location while bodily orienting said workpiece relative to said base,
    a head assembly,
    means mounting said head assembly on said base for free movement relative thereto, said head assembly including holding means for engaging said workpiece at a second location spaced relative to said first location, whereby said head assembly is located relative to said base in accordance with the workpiece configuration between said first and second locations and its orientation relative to said base as determined by said locating means,
    gaging means cooperating between said base and said head assembly responsive to the location of said head assembly relative to said base as determined by the workpiece configuration,
    and power means cooperating between said base and said head assembly responsive to said gaging means for applying bending forces to said workpiece through said holding means for bending said workpiece to a desired form as determined by said gaging means.

2. A machine for bending an elongated workpiece to a desired form comprising,
    a base,
    a plurality of spaced apart locating means on said base, each locating means including clamping means for selectively engaging said workpiece at locations therealong and rigidly positioning said workpiece relative to said base at each location while bodily orienting said workpiece relative to said base,
    a head assembly,
    means for mounting said head assembly on said base for free movement relative thereto, said head assembly having holding means thereon for engaging said workpiece at a location spaced from said locating means, whereby said head assembly is positioned relative to said base in accordance with the workpiece configuration and the orientation of said workpiece relative to said base as determined by said locating means, gaging means responsive to the location of said head assembly relative to said base as determined by the workpiece configuration, and power means cooperating between said base and said head assembly for applying bending forces to said workpiece through said holding means for bending said workpiece to a desired form as determined by said gaging means.

3. A machine for bending a workpiece to a desired form comprising, a base, locating means on said base including clamping means for engaging said workpiece at a first location thereon for rigidly locating said workpiece relative to said base at said first location while bodily orienting said workpiece relative to said base, a head assembly, means mounting said head assembly on said base for free movement about first and second mutually perpendicular axes intersecting at a point fixed relative to said base, said head assembly including holding means for engaging said workpiece at a second location spaced relative to said first location, whereby said head assembly is located relative to said base about said axes in accordance with the workpiece configuration between said first and second locations and its orientation relative to said base as determined by said locating means, gaging means cooperating between said base and said head assembly for measuring the location of said head assembly relative to said base as determined by the workpiece configuration, said gaging means including first measuring means for measuring movements of said head assembly about said first axis and second measuring means for measuring movements of said head assembly about said second axis, and first and second power means cooperating between said base and said head assembly responsive respectively to said first and second measuring means for applying bending forces to said workpiece about the respective axes through said holding means for bending said workpiece to a desired form as determined by said measuring means.

4. A machine for bending a workpiece to a desired form as set forth in claim 3 in which said gaging means comprises, a support mounted for movement on the base, a reference stop on said support for positioning engagement with said head assembly, and means mounting said first and said second measuring means on said support at locations offset from said stop in measuring association with said head assembly for response to displacements of said head assembly about said first and second axes respectively.

5. A machine for bending a workpiece to a desired form as set forth in claim 4 in which said support is carried for movement along an axis parallel to an axis perpendicular to said first and second axes, and wherein said first measuring means is offset from said stop along a line parallel to said second axis for measuring movements of said head assembly about said first axis, and said second measuring means is offset from said stop along a line parallel to said first axis for measuring movements of said head assembly about said second axis.

6. A machine for bending a workpiece to a desired form as set forth in claim 4 comprising, a housing fixed to the base, said support being provided by an air piston movable within said housing and carrying said measuring means and reference stop, and means for supplying a controlled air pressure to said housing and against said piston to urge said measuring means and reference stop carried thereby against the head assembly during gaging to exert a predetermined force and to retract said piston during nongaging operations.

7. A machine for bending a workpiece to a desired form comprising, a base, locating means on said base including clamping means for engaging said workpiece at a first location thereon for rigidly locating said workpiece relative to said base at said first location while bodily orienting said workpiece relative to said base, a head assembly, means mounting said head assembly on said base for free movement relative thereto, said head assembly including holding means for engaging said workpiece at a second location spaced relative to said first location, whereby said head assembly is located relative to said base in accordance with the workpiece configuration between said first and second locations and its orientation relative to said base as determined by said locating means, gaging means cooperating between said base and said head assembly responsive to the location of said head assembly relative to said base as determined by the workpiece configuration, power means cooperating between said base and said head assembly for applying bending forces to said workpiece through said holding means, and control means responsive to the gaging means and operatively connected to said power means to control the magnitude and direction of bending force application to bend said workpiece to a desired form.

8. A machine for bending a workpiece to a desired form comprising, a base, locating means on said base including clamping means for engaging said workpiece at a first location thereon for rigidly locating said workpiece relative to said base at said first location while bodily orienting said workpiece relative to said base, a head assembly, means mounting said head assembly on said base for free movement relative thereto, said head assembly including holding means for engaging said workpiece at a second location spaced relative to said first location, whereby said head assembly is located relative to said base in accordance with the workpiece configuration between said first and second locations and its orientation relative to said base as determined by said locating means, gaging means cooperating between said base and said head assembly infinitely responsive to the location of said head assembly relative to said base to provide a gaging signal as determined by the workpiece configuration, power means cooperating between said base and said head assembly for applying bending forces to said workpiece through said holding means for bending said workpiece to a desired form, and control means infinitely responsive to said gaging signal and operatively connected to said power means to infinitely control the magnitude and direction of bending force application within established force levels to bend said workpiece to a desired form.

9. A machine for bending a workpiece to a desired form comprising, a base, locating means on a base for engaging said workpiece, a head assembly on the base, said head assembly including means for engaging said workpiece at a location spaced relative to said locating means for applying bending forces to said workpiece in opposition to said locating means, gaging means responsive to the direction and magnitude of deviation of said workpiece from the desired form providing an infinitely variable electrical gaging signal having a signal level determined by the magnitude of deviation and polarity determined by the direction thereof, power means operatively connected to said head assembly for applying bending forces to said workpiece.

control means infinitely responsive to said gaging signals and operatively connected to said power means comprising, a pressure programmer including a balancing network for receiving infinitely variable electrical input from said gaging means and providing an infinitely variable electrical output signal determined thereby, and a force controller receiving said electrical output signal and controlling said power means for force application infinitely determined by the magnitude of deviation and in opposition thereto to bend said workpiece to a desired form.

10. A machine for bending a workpiece to a desired form comprising, a base, locating means on said base including clamping means for engaging said workpiece at a first location thereon for rigidly locating said workpiece relative to said base at said first location while bodily orienting said workpiece relative to said base, a head assembly, means mounting said head aessembly on said base for free movement relative thereto, said head assembly including holding means for engaging said workpiece at a second location spaced relative to said first location, whereby said head assembly is located relative to said base in accordance with the workpiece configuration between said first and second locations and its orientation relative to said base as determined by said locating means, gaging means cooperating between said base and said head assembly responsive to the location of said head assembly and to the direction and magnitude of deviation of said workpiece from the desired form providing an infinitely variable electrical gaging signal having a signal level determined by the magnitude of deviation and polarity determined by the direction thereof, power means cooperating between said base and said head assembly for applying bending forces to said workpiece through said holding means, control means infinitely responsive to said gaging signals and operatively connected to said power means comprising, a pressure programmer including a balancing network for receiving infinitely variable electrical input from said gaging means and providing an infinitely variable electrical output signal determined thereby.

and force controller receiving said electrical output signal and controlling said power means for force application infinitely determined by the magnitude of deviation and in opposition thereto to bend said workpiece to a desired form.

11. A machine for bending a workpiece to a desired form comprising;

a base;

locating means on the base for engaging said workpiece;

a head assembly on the base, said head assembly including means for engaging said workpiece at a location spaced relative to said locating means for applying bending forces to said workpiece in opposition to said locating means;

gaging means infinitely responsive to the direction and magnitude of deviation of said workpiece from the desired form and providing an infinitely variable electrical gaging signal having a signal level determined by the magnitude of deviation and polarity determined by the direction thereof;

power means operatively connected to said head assembly for applying bending forces to said workpiece;

control means operatively connected to said gaging means for receiving electrical gaging signals therefrom and providing electrical output signals determined thereby, said control means including mode determining means providing output signals which are variable in predetermined increments in response to workpiece deviations outside predetermined transition limits and infinitely variable within such limits, and acceptable limit means responsive to workpiece deviations in an acceptable tolerance of more limited extent within the range established by said transition limits;

and a force controller connected to said control means for receiving said electrical output signals and controlling said power means in accordance therewith and in the mode determined by said mode determining means for force application determined by the magnitude of deviation and in opposition thereto to bend said workpiece to a desired form.

12. A machine for bending a workpiece to a desired form comprising, a base;

locating means on said base including clamping means for engaging said workpiece at a first location thereon for rigidly locating said workpiece relative to said base at said first location while bodily orienting said workpiece relative to said base;

a head assembly;

means mounting said head assembly on said base for free movement relative thereto, said head assembly including holding means for engaging said workpiece at a second location spaced relative to said first location, whereby said head assembly is located relative to said base in accordance with the workpiece configuration between said first and second locations and its orientation relative to said base as determined by said locating means;

gaging means cooperating between said base and said head assembly responsive to the location of said head assembly and to the direction and magnitude of deviation of said workpiece from the desired form providing an infinitely variable electrical gaging signal having a signal level determined by the magnitude of deviation and polarity determined by the direction thereof;

power means cooperating between said base and said head assembly for applying bending forces to said workpiece through said holding means;

control means operatively connected to said gaging means for receiving electrical gaging signals therefrom and providing electrical output signals determined thereby, said control means including mode determining means providing output signals which are variable in predetermined increments in response to workpiece deviations outside predetermined transition limits and infinitely variable within such limits, and acceptable limit means responsive to workpiece deviations in an acceptable tolerance of more limited extent within the range established by said transition limits;

and a force controller connected to said control means for receiving said electrical output signals and controlling said power means in accordance therewith and in the mode determined by said mode determining means for force application determined by the magnitude of deviation and in opposition thereto to bend said workpiece to a desired form.

13. A machine for bending a workpiece to a desired form comprising, a base, locating means on the base for engaging said workpiece, a head assembly on the base, said head assembly including means for engaging said workpiece at a location spaced relative to said locating means for applying bending forces to said workpiece in opposition to said locating means, gaging means responsive to the direction and magnitude of deviation of said workpiece from the desired form in a plurality of relatively transverse directions and providing electrical gaging signals in accordance therewith, power means operatively connected to said head assembly for selectively applying bending forces to said workpiece in a corresponding plurality of relatively transverse directions, control means responsive to said gaging signals and operatively connected to said power means comprising, a pressure programmer for receiving variable electrical input from said gaging means and providing a variable electrical output signal determined thereby, and a force controller receiving said electrical output signal and controlling said power means for force application determined by the magnitude of deviation and in opposition thereto in the selected direction to bend said workpiece to a desired form.

14. A machine for bending a workpiece to a desired form comprising, a base, locating means on the base for engaging said workpiece, a head assembly on the base, said head assembly including means for engaging said workpiece at a location spaced relative to said locating means for applying bending forces to said workpiece in opposition to said locating means, gaging means infinitely responsive to the direction and magnitude of deviation of said workpiece from the desired form in a plurality of relatively transverse directions and providing infinitely variable electrical gaging signals having signal levels determined by the magnitude of deviation and polarity determined by the direction thereof, power means operatively connected to said head assembly for selectively applying bending forces to said workpiece in each of said relatively transverse directions, control means infinitely responsive to said gaging signals and operatively connected to said power means comprising, pressure programmer means including a balancing network means for receiving infinitely variable electrical input from said gaging means and providing infinitely variable electrical output signals determined thereby, force controlling means receiving said electrical output signals and controlling said power means for force application infinitely determined by the magnitude of deviation and in opposition thereto to bend said workpiece to a desired form, and programming means cooperatnig with said force controlling and power means for selectively determining the application of force in said relatively transverse directions.

15. A machine for bending an elongated workpiece to a desired form comprising, a base, a plurality of spaced apart locating means on said base, each locating means including clamping means for selectively engaging said workpiece at locations therealong and rigidly positioning said workpiece relative to said base at each location while bodily orienting said workpiece relative to said base, a head assembly, means for mounting said head assembly on said base for free movement relative thereto, said head assembly having holding means thereon for engaging said workpiece at a location spaced from said locating means, whereby said head assembly is positioned relative to said base in accordance with the workpiece configuration between each locating means and said holding means and in accordance with the orientation of said workpiece relative to said base as determined by said locating means, gaging means infinitely responsive to the location of said head assembly relative to said base to provide gaging signals determined by the direction and magnitude of deviation of said workpiece from the desired form in a plurality of reference directions, power means cooperating between said base and said head assembly for selective application of corrective bending forces through said holding means to said workpiece in each of said reference directions, programming means cooperating with said clamping means and said power means for selecting the clamping means in a desired sequence for selective engagement of the workpiece at each of said locations therealong and to select the sequence of force application in said reference directions, and control means responsive to said programming means and infinitely responsive to said gaging signals operatively connected to said power means to infinitely control the magnitude and direction of bending force application in each of said reference directions in a sequence determined by said programming means to thereby bend said workpiece to a desired form.

16. A machine for bending an elongated workpiece to a desired form comprising, a base, a plurality of spaced apart locating means on said base, each locating means including clamping means for selectively engaging said workpiece at locations therealong and rigidly positioning said workpiece relative to said base at each location while bodily orienting said workpiece relative to said base, a head assembly, means for mounting said head assembly on said base for free movement about a point fixed with relation to said base, said head assembly having holding means for engaging said workpiece at a location spaced from said locating means, whereby said head assembly is positioned relative to said base in accordance with the workpiece configuration between each locating means and said holding means and in accordance with the orientation of said workpiece relative to said base as determined by said locating means, gaging means for gaging movements of said head assembly about said fixed point including first measuring means for measuring rotary displacement of said head assembly about a first axis through said point, second measuring means for measuring displacement about a second axis generally perpendicular to said first axis and third measuring means for measuring displacement about a third axis generally perpendicular to said first and second axes, and power means cooperating between said base and said head assembly for applying bending forces to said workpiece through said holding means for bending said workpiece to a desired form as determined by said measuring means.

17. A machine for bending a workpiece to a desired form comprising, a base, locating means on said base including clamping means for engaging said workpiece at a first location thereon for rigidly locating said workpiece relative to said base at said first location while bodily orienting said workpiece relative to said base, a head assembly, means for mounting said head assembly on said base for free rotary movements about a given axis, said head assembly having holding means for engaging said workpiece at a second location spaced from said first location, whereby said head assembly is positioned relative to said base in accordance with the workpiece configuration between said first and second locations and in accordance with the orientation of said workpiece relative to said base as determined by said locating means, a reference portion on said head assembly positioned in accordance with its movements about said axis, gaging means carried on said base for positioning about said axis having signal means responsive to the position of said reference portion relative to the position of said gaging means, positioning means for locating said gaging means at predetermined reference positions about said axis, and power means cooperating between said base and said head assembly responsive to the signal provided by said gaging means for applying bending forces to said workpiece through said holding means for bending said workpiece to a desired form as determined by said gaging means.

18. A machine for bending a workpiece to a desired form comprising, a base, a plurality of spaced apart locating stations on said base, each locating station including clamping means for selectively engaging said workpiece at predetermined locations therealong and rigidly positioning said workpiece relative to said base, a head assembly, means for mounting said head assembly on said base for free rotary movements about a given axis, said head assembly having holding means for engaging said workpiece at a location spaced from said locating means, whereby said head assembly is positioned relative to said base in accordance with the workpiece configuration between each locating station and said holding means and in accordance with the orientation of said workpiece relative to said base as determined by said locating stations, a reference portion on said head assembly positioned in accordance with its movements about said axis, gaging means carried on said base for positioning about said axis having signal means responsive to the position of said reference portion relative to the position of said gaging means, positioning means for locating said gaging means at reference positions about said axis predetermined for each of said locating stations, and power means cooperating between said base and said head assembly responsive to the signal provided by said gaging means for applying bending forces to said workpiece through said holding means for bending said workpiece to a desired form as determined by said gaging means.

19. A machine for bending a workpiece to a desired form comprising, a base, a plurality of spaced apart locating stations on said base, each locating station including clamping means for selectively engaging said workpiece at predetermined locations therealong and rigidly positioning said workpiece relative to said base, a head assembly, means for mounting said head assembly on said base for free rotary movements about a given axis, said head assembly having holding means for engaging said workpiece at a location spaced from said locating stations, whereby said head assembly is positioned relative to said base in accordance with the workpiece configuration between each locating station and said holding means and in accordance with the orientation of said workpiece relative to said base as determined by said locating stations, a reference portion on said head assembly positioned in accordance with its movements about said axis, a reference ring, means for mounting said reference ring on said base for rotation about said axis, gaging means carried by said ring for measuring rotary displacement of said reference portion relative thereto, positioning means for locating said ring and gaging means carried thereby at reference positions about said axis predetermined for each of said locating stations, and power means cooperating between said base and said head assembly responsive to the signal provided by said gaging means for applying bending forces to said workpiece through said holding means for bending said workpiece to a desired form as determined by said gaging means.

20. A machine for bending a workpiece to a desired form as set forth in claim 19 in which said positioning means comprises, means for selectively coupling said ring to said head assembly for coarse positioning of said ring during rotation thereof, and indexing means cooperating between said base and said ring for precise positioning of said reference ring about said axis and relative to said base and the respective locating stations carried thereby.

21. A machine for bending a workpiece to a desired form as set forth in claim 20 in which said indexing means comprises, a plurality of carriers adjustably mounted on said ring, each having a projecting tab, a reference stop mounted on the base, a power operated index unit for engaging and bringing each respective tab into alignment with said cooperating reference stop to precisely position said ring relative thereto, and a controller for controlling the operation of said index unit.

22. A machine for bending a workpiece to a desired form as set forth in claim 20 further comprising, a reversible drive mounted on the base engageable with said ring for rotation thereof, and control means responsive to said gaging means to energize said drive for rotation of said ring with said head assembly during bending and reversely to a reference position corresponding to the respective locating station following bending for precise positioning by said index unit.

23. A machine for bending an elongated workpiece to a desired form comprising, a base, a plurality of spaced apart locating means on said base, each locating means including clamping means for selectively engaging said workpiece at locations therealong and rigidly positioning said workpiece relative to said base at each location while bodily orienting said workpiece relative to said base, a head assembly, means mounting said head assembly on said base for free movement relative thereto, said head assembly having holding means thereon for engaging said workpiece at a location spaced from said locating means, whereby said head assembly is positioned relative to said base in accordance with the workpiece configuration between each locating means and said holding means and in accordance with the orientation of said workpiece relative to said base as determined by said locating means, gaging means infinitely responsive to the location of said head assembly relative to said base to provide gaging signals determined by the direction and magnitude of deviation of said workpiece from the desired form in a plurality of reference directions, power means cooperating between said base and said head assembly for selective application of corrective bending forces through said holding means to said workpiece in each of said reference directions, programming means cooperating with said clamping means and said power means for selecting the clamping means in a desired sequence for selective engagement of the workpiece at each of said locations therealong and to select the sequence of force application in said reference directions, and control means responsive to said programming means and infinitely responsive to said gaging signals and operatively connected to said power means to infinitely control the magnitude and direction of bending force application in each of said reference directions in a sequence determined by said programming means, said control means comprising a plurality of pressure programmers one for each reference direction, each including a balancing network for balancing said gaging signals and converting said gaging signals to useable electrical outputs, and a plurality of pressure controllers, one for each reference direction cooperating with each pressure programmer for a reference direction for receiving said electrical outputs and controlling said power means to bend said workpiece in each of said reference directions to a desired form.

References Cited by the Examiner

UNITED STATES PATENTS

| | | | |
|---|---|---|---|
| 409,048 | 8/1889 | Larkin | 72—177 |
| 1,015,429 | 1/1912 | Fahrney | 72—177 |
| 1,909,097 | 5/1933 | Damerell | 72—299 |
| 2,297,055 | 8/1942 | Grad | 72—299 |
| 2,750,986 | 6/1956 | Russell et al. | 72—8 |
| 3,067,800 | 12/1962 | Gogan | 72—299 |
| 3,190,261 | 6/1965 | Ziffer | 72—8 |

FOREIGN PATENTS 850,669  10/1960  Great Britain.

CHARLES W. LANHAM, *Primary Examiner.*

W. H. JUST, *Assistant Examiner.*